United States Patent [19]

Alvarez et al.

[11] Patent Number: 4,906,398
[45] Date of Patent: Mar. 6, 1990

[54] REACTIVE ABSORBENTS FOR THE CONSERVATION OF HARVESTED VEGETABLE PRODUCTS

[75] Inventors: Jesûs B. Alvarez; Pedro A. Garcia, both of Madrid, Spain

[73] Assignee: Jose Velasco Perez, Madrid, Spain

[21] Appl. No.: 58,574

[22] Filed: Jun. 5, 1987

[30] Foreign Application Priority Data

Jul. 30, 1986 [ES] Spain .................................. 8600704
Mar. 30, 1987 [ES] Spain .................................. 8700899

[51] Int. Cl.$^4$ .............................................. C09K 3/00
[52] U.S. Cl. ......................... 252/186.33; 252/186.24; 426/124; 426/324; 426/419; 502/410
[58] Field of Search ............... 426/419, 418, 124, 324, 426/316; 252/186.33, 186.24; 423/245.1, 246, 247, 331; 502/63, 80, 410

[56] References Cited

U.S. PATENT DOCUMENTS

| | | | |
|---|---|---|---|
| 1,598,254 | 8/1926 | Prutzman et al. | 502/410 |
| 2,434,418 | 1/1948 | Lalande | 502/410 |
| 2,450,549 | 10/1948 | Greentree | 502/410 |
| 2,674,509 | 4/1954 | Barnet | 426/419 |
| 3,445,194 | 5/1969 | Thomas et al. | 426/419 |
| 4,041,642 | 8/1977 | Krugler et al. | 47/DIG. 6 |
| 4,146,993 | 3/1979 | Freeman | 47/DIG. 6 |
| 4,163,342 | 8/1979 | Fogg et al. | 47/DIG. 6 |
| 4,226,672 | 5/1987 | Van Nostrand | |
| 4,337,276 | 6/1982 | Nakamura et al. | 426/419 |

FOREIGN PATENT DOCUMENTS

| | | |
|---|---|---|
| 0071533 | 3/1982 | European Pat. Off. |
| 56-18901 | 2/1981 | Japan |
| 56-36401 | 9/1981 | Japan |
| 56-68346 | 9/1981 | Japan |
| 58-20149 | 2/1983 | Japan |
| 58-196846 | 11/1983 | Japan |
| 58-220648 | 12/1983 | Japan |

OTHER PUBLICATIONS

Alvarez, A. "Sepiolite: Properties and Uses" pp. 253–287, Developments in Sedimentology, ed. Singer (Elsevier-Amsterdam) (1984).
Absorbents Employed in Preserving Fruit and Vegetables, (List of All Chem. Abstracts).
Hort. Science, vol. 5, No. 1, Feb. 1970, pp. 25–27, "Storage of Bananas in Polyethylene bags with an ethylene . . .".
Chemical Abstracts, vol. 95, No. 6, Sep. 1981, p. 489, Abst. No. 95798q.
Chemical Abstracts, vol. 95, No. 2, Jul. 1981, p. 536, Abst. No. 23182m.
Chem. Abstracts, vol. 95, No. 1, Jul. 1981, p. 519, Abs. No. 5329k, "Regulation of Fruit Ripening. II. Use of Perlitepotassium . . .".
Mark Sherman, Control of Ethylene in The Post-Harvest Environment, Hort. Science, vol. 20(1), Feb. 1985, pp. 57–60.

Chem. Abstract, Itoga and Ogino, *Molecular Sieve as a Purging* . . . , vol. 90(22) 173939z, 1979.
Chem. Abstract, Nishimura, Uehara et al., *Adsorbent for Ethylene*, vol. 90, (26) 205186v, 1979.
Chem. Abstract, Nakamura and Nakazawa, *Freshness--Preservation agent* . . . , vol. 91, (7) 54953k, (1979).
Chem. Abstract, Haga, *Preservatives for Fresh Fruits and Vegetables*, vol. 94, (21) 173144u, (1981).
Chem. Abstract, Kuraray Chem. Co., Ltd., *Palladium Chloride-Activated* . . . , vol. 95, (7) 60211r, (1981).
Chem. Abstracts, Pech., Latche, et al., *Product for Ethylene Decay in Food* . . . , vol. 98, (23) 196724e, (1983).
Chem. Abstract, Fukuoka Seishi, *Modified Activated Carbon as an Ethylene* . . . , vol. 99, (16) 124904m, 1983.
Chem. Abstract, Pech, Latche et al., *Removal of Ethylene in Chambers* . . . , vol. 100, (11) 82413g, (1984).
Chem. Abstract, Tokuyama Soda Co., Ltd., *Ethylene Adsorbent for Fruit Storage*, vol. 100, (17) p. 137671x, (1984).
Chem. Abstract, Toyo Soda Mfg. Col., Ltd., *Fresh Fruit and Vegetable Preserves*, vol. 100, (17) 1376726, (1984).
Chem. Abstract, Toyo Soda Mfg. Co., Ltd., *Fresh Fruit and Vegetable Preservation*, vol. 98, (2) 177825x, (1983).
Chem. Abstract, Nippon Soda Co., Ltd., *Preservation Composition for Fresh Fruits* . . . , vol. 101, (5) 37380d, (1984).
Chem. Abstract, Tettori, Nagyo et al., *Sweetening Astringent Persimmons*, vol. 102 (21) 184031q, (1985).
Chem. Abstract, Bode, Schulze et al., *Climate Control for Fruit Storage Units*, vol. 103, (13) p. 103753x, (1985).
Chem. Abstract, Fetkenheuer, Harms et al., *Regulating the Atmosphere for Fruit Storage*, vol. 104, (7) 50112z, (1986).
Chem. Abstracts, Osajima and Yamamura, *Adsorbents for Hydrocarbon Compounds*, vol. 104, (18) 151369u, (1986).
Chem. Abstract, Baba, Noda et al., *Olefin Gas Adsorbents of Zeolite-Type*, vol. 104, (2) 7811g, (1986).
Chem. Abstract, Oshima, *Preservation of Fruits and Flowers*, vol. 105, (11) 96279h, (1986).

(List continued on next page.)

*Primary Examiner*—Wilbur Bascomb
*Attorney, Agent, or Firm*—Ladas & Parry

[57] ABSTRACT

There are described new reactive adsorbents from sepiolite, as carrier, and an oxidant agent, particularly a permanganate salt, preferably potassium permanganate. There is also described the process for preparing said reactive adsorbents, and a process for preserving harvested vegetable products and fruit using said reactive adsorbents. Said preserving process involves oxidation to carbon dioxide ($CO_2$) of the ethylene generated by the vegetable products and fruit, by contact of the atmosphere surrounding the vegetable with the reactive adsorbents of the invention.

2 Claims, No Drawings

OTHER PUBLICATIONS

Chem. Abstract, Terada, Yamada et al., *Preservation of Fruits and Flowers by Reducing . . .* , vol. 105, (11) 96283e, (1986).

Chem. Abstract, Kobavashi, Ichimura et al., *Preservation of Freshness of Vegetables . . .* , vol. 106, (17) 137253m, (1987).

Chem. Abstract, Jameson, John National Research Devp. Corp., *Procedure and Separate for . . .* , vol. 107, (1) 6088j, (1987).

Chem. Abstract, Ikeda, *Fresh Fruit and Vegetable Preservatives,* vol. 107, (17) 153187u, (1987).

Chem. Abstract, Kitayama, *Preserving Apples and Apple Case for Use in Practicing . . .* , vol. 104, (19) p. 167224o, (1986).

REACTIVE ABSORBENTS FOR THE CONSERVATION OF HARVESTED VEGETABLE PRODUCTS

OBJECT OF THE INVENTION

The present invention relates to new improved reactive absorbents for preserving harvested vegetable products of a sepiolite carrier impregnated with an aqueous solution of potassium permanaganate and to a process for preserving said picked vegetable products which uses said new reactive adsorbents. The process for manufacturing these reactive adsorbents is also described.

BACKGROUND OF THE INVENTION

The work by Denny F. E., J. Arg. Res., 27, 757–759 (1924) is perhaps one of the first where the effect of ethylene on the preservation of fruit and plants was shown; the author specifically describes a method for yellowing green lemons using ethylene. Later on, a series of studies were published based on that work, such as the one by Harvey R. B., *Univ. of Minn. Agr. Expt. Sta. Rs. Bul.* 147 (1928) on the industrial applications of ethylene in ripening tomatoes, pears, apples, pineapples, bananas, etc. At the present time, these methods constitute a commercial practice in general use. A recent review of this property of ethylene may be found in the article "Effects of Ethylene on the Quality of Fruits and Vegetables" by Alley E. Watade in *"Food Technology"* pp. 82–85, May 1986.

However, quite often it is undesirable to accelerate the ripening process in the harvested product, but on the contrary, and such being the case of the invention, it is of interest to reduce the rate of said process, to bring the availability of the product into line with market demand, which constitutes one of the aims of the present invention.

DISCUSSION OF PRIOR ART

One of the ways to retard the ripening of the harvested products has been to employ chemical substances, such as silver nitrate, certain hydrazides, chlorinated hydrocarbons, etc., which are sprayed onto the vegetable product. This technique, though limiting the decomposition of the product, has serious drawbacks from the point of view of health.

Another technique consists in reducing the respiratory capacity of certain harvested products, proceeding to preserve them at low temperatures and, on occasions, under controlled atmospheres. This approach to the problem has the disadvantage that considerable installation and maintenance costs are required.

Another set of techniques, within which the invention fits, is based on eliminating the ethylene from the atmospheric medium surrounding the vegetable species the ripening and deterioration whereof it is desired to retard.

As is well known, during the process of ripening picked fruit and plants these generate ethylene (along with aldehydes, alcohols and others) which accelerate ripening of said products, producing whitering, overripening, softening and, at the end, rotting through the action of certain microorganisms. The studies carried out on its negative effect on plant preservation were reviewed by Abeles, F. A., "Ethylene in plant biology", Academic Press, N.Y. (1973) and continue to appear in the specialised literature; thus, for example, recently Risse, L. A. and Hatton, T. T., Hortscience 17(6), 946–948 (1982) have been studying the negative effect of ethylene on preservation of picked watermelons; Knee, M. and Hatfield, S. G., Ann. Appl. Biol. 98, 157–165 (1981) point to the advantages which are obtained by elimination of ethylene in preserving apples. Similar studies were carried out by Scott, K. J., Gingni, J. and Bailey, W. M., J. Hort, Sci. 59(4), 563–566 for the kiwi, Miyazaki, T. J. Japan Soc. Hort. Sci. 51(1), 85–92 (1983) for the apricot, etc., such that the subject is sufficiently documented in literature. To these bibliographical references the above mentioned work by Alley E. Watade has to be added.

Elimination of the ethylene generated by picked plants and fruit can be carried out chiefly by two processes: (a) by their combustion on total oxidation catalysts and (b) by reaction with compounds of high oxidant power.

Total oxidation catalysts are generally prepared by supporting noble metals on solid carriers of controlled surface area. The impregnation of $PdCl_2$ on activated carbon, described in Japanese Patent 8155147 (1981), serves as example. In these processes it is necessary to heat the air containing the ethylene before proceeding to its catalytic elimination, which has likely limited its possibilities for industrial application.

Regarding high oxidant power compounds a great number of them have been tested, although the permanganate salts on carriers are the compounds most used in industrial practice. These products are generally prepared by impregnating permanganate salt solutions into solid carriers which usually have a high surface area. Thus, for example, in Japanese Patent 8118901 certain zeolites are used as carrier; in Japanese Patent 8320149 magnesium aluminate is used; in Japanese Patent 83196846 calcium silicate; in Japanese Patent 83220648, silica-alumina gels; and in European Patent 71553 perlite of diatomaceous earth.

As for an oxidant agent other than permanganate, the use of $FeCl_2$ (ferrous chloride) on bentonite and zeolite carriers from German Patent (GFR) 2.843.499 is known.

The use of high surface area carriers allows the impregnation of greater amounts of permanganate salts and, therefore, the elimination of greater amounts of ethylene. These products, however, have two drawbacks: (i) on the one hand the hight cost of preparing the carrier and, on the other, (ii) the inevitable and undesirable adsorption capacity of the $CO_2$ which is generated in the ethylene eliminating reaction, the presence of said $CO_2$ in the medium generally turning out to be beneficial for preserving picked plants and fruit. See, for example, Arpaia, M. L. et al., J. Am. Soc. Hortic. Sci., 110(2), 200–203 (1985).

DETAILED DESCRIPTION OF THE INVENTION

It is one object of the present invention to provide new improved adsorbents of the type of carrier impregnated with oxidant agent, preferably potassium permanganate, the improvement lying in the specific nature of the carrier constituted by sepiolites.

Sepiolites, which are natural hydrated magnesium silicates, when impregnated with an oxidant agent, such as $KMnO_4$ forming the new reactive adsorbents of the present invention, overcome the two serious drawbacks (i) and (ii) mentioned above, and act markedly better for vegetable preservation as shown in the comparative examples described hereinafter.

Sepiolites have a fibrous structure consisting of talc-type ribbons with two sheets of tetrahedral silica units linked to a octahedral sheet of magnesium units through oxygen atoms. The alternating arrangement of said units determines the presence of channels oriented in the direction of the fibre the section whereof is $3.6 \times 10.6$ Å. In is structure $Si_{12}Mg_8(OH)_3O_{30}(H_2O)_4$, has adsorbed water, crystallization water and constitution water of hydroxyl groups. Sepiolites are, therefore, compounds with great capacity for water exhange, the configuration whereof allows solely the adsorption of small polar molecules in their channels.

Sepiolites are to be found in great quantity and of high purity in Spain, and are widely used in liquid absorption and purifying processes because of their high surface area which allows them to retain water in amounts up to 250% of their weight. However, their capacity for absorbing non-polar molecules is very limited since in this phenomenon only their outer surface would be operative. In accordance with these characteristics, sepiolites have great capacity for absorbing the aqueous solution of the oxidant agent of the ethylene, which favours the impregnation of the permanganate salt. Moreover, they have a virtually inactive surface for absorbing the $CO_2$ generated or present in the medium.

An additional advantage from using these carriers is the possibility of regulating environmental moisture. That is, the reactive adsorbents can be prepared with the degree of moisture considered more suitable for each application, such that the reactive adsorbent will be able to adsorb or desorb water from the environment or, within certain limits, to keep the moisture of the medium constant.

According to the present invention the new improved reactive adsorbents are presented in a variety of shapes such as particles (powders or granular form), tablets, discs, pellets, cylinders, extrudates, reloadable cartridges for filters and the like, manufacturing process wherefor is hereinafter described.

The activity of the reactive adsorbents object of this application not only lies in the elimination, by adsorption or absorption, of the organic compounds mentioned but, moreover, in their surface a chemical transformation with desorption takes place, which constitutes their most singular operational characteristic, that is, the oxidation of ethylene to carbon dioxide ($CO_2$) involves the desorption of a great part of $CO_2$ generated to the surrounding medium. Accordingly, in the case of the granulated adsorbent $\sim 0.5$ moles of $CO_2$ are desorbed for each mole of ethylene eliminated and in the case of the extruded adsorbent $\sim 0.75$ moles of $CO_2$ per each mole of eliminated ethylene are desorbed. The presence of $CO_2$ in the surrounding atmosphere of the vegetables which are preserved turns out to be beneficial in the majority of cases.

It is to be borne in mind that, in the present state of the art, there is knowledge of a series of compounds the function whereof is the adsorption or absorption of undesirable organic compounds, chiefly ethylene, and as also those too the function whereof is the generating of carbon dioxide, but both functions are not capable of being carried out simultaneously by a sole compound. A clarifying example is to be found in Spanish Patent 480.710 where the adsorption of the organic compounds is carried out by means of conventional adsorbents such as active carbon, activated clay, bentonite, zeolite, activated alumina and mixtures thereof, whereas if $CO_2$ generation is required, use is made of other materials such as, for example, heptahydrated ferrous sulfate along with sodium bicarbonate. In the present invention one can, therefore, properly state that the vegetable preserving process benefits from the twofold function: (1) elimination of ethylene and other undesirable organic compounds and (2) provision od carbon dioxide ($CO_2$) to the medium. Another advantage provided by the use of said reactive adsorbents is that they carry out said two-fold function, not only at room temperature, but at the low temperatures at which certain types of vegetables are normally preserved in cold chambers, as shown in the tests described in the examples provided hereinafter in the present Specification.

During the studies carried out while doing the experimental work for developing the invention, it was posssible to verify that other natural silicates, of similar structure to sepiolites, have a qualitative action analogous to the one described for sepiolites. However, the activity per unit of weight of said reactive adsorbents prepared with other silicates not being sepiolite turned out to be significantly lower. Specifically, this lower action has been observed with other silicates, particularly with attapulgite which is a natural silicate containing equivalent amounts of aluminium and magnesium oxides. Consequently, it seems to be gathered that, of the numerous types of solid carriers which are known to have properties of high surface area and high capacity for absorption of active compound impregnating solutions, only sepiolite has the set of advantageous characteristics to which reference has been made above, for use as reactive adsorbents for preserving harvested vegetable organs and fruits.

The process for preparing the reactive adsorbents of the invention in the form of particles (powder or granules) consists in impregnation by conventional methods of an aqueous solution of the permanganate salt on sepiolite granules preferably between 2 and 4 mm in size. The sepiolite can be treated previously at temperatures not exceeding 250° C. The solid drains and then dries suitably at temperatures between 20° and 150° C. for a time less than 6 hours.

The product so obtained has an elimination capacity of 1 mole of ethylene per each 2 moles of permanganate present and generates 0.5 moles of $CO_2$ per each mole of ethylene eliminated. The rest of the products of the reaction are oxides and carbonates of the metals present, which remain deposited in the carrier.

The other forms of presentation are prepared from sepiolite particles (powder or granules) by a process which comprises the following steps.

Firstly, powdered sepiolite is mixed with an aqueous permanganate solution, preferably $KMnO_4$, which has a concentration of 0.5 to 10% by weight, preferably 2.5%. The amount of solution used is chosen such that a kneadable mass is formed which, once having been homogeneised by kneading, forms a thick slurry.

Next, the slurry obtained is shaped, by extrusion or another suitable moulding technique, into a selected form of tablets, cylinders, rechargeable cartridges for filters, extrudates or any other physically appropriate shape. The dimensions of these shapes can vary from 2-3 mm in diameter and 3-5 mm in length for cylinders, up to cartridges of 10 cm in diameter and 20-25 cm long for reloadable cartridge for filters.

Finally, the pieces so obtained are dried by heating until they have a water content not exceeding 30% by weight. In this step drying temperatures are used not exceeding about 160° C., preferably in the range of about 20° C. to about 150° C., and for a time not exceeding 12 hours, preferably within the range of about 1 to 8 hours.

Between the mixing and shaping steps a partial drying step can be carried out, optionally, to facilitate the next shaping step.

Another object of this application is to provide an improved process for preserving harvested vegetable organs and fruits.

Said preserving process comprises, according to a first embodiment, keeping the vegetable species to be preserved in a closed, semi-closed or open housings, maintaining a temperature of −6° C. to room temperature, and optionally illuminated discontinously by flourescent light of wave length compatible with the respiratory activity of the the vegetable, said vegetable species being placed in the housings, in adjacent position to containers of material permeable to gases, which contain the reactive adsorbents of the invention. Within the context of this Specification, the word "housing" means cooled or uncooled chambers and containers, cooled or uncooled counters, boxes or packaging for transport and household refrigerators, etc. The arrangement of the reactive adsorbents in the housings is such that they are to be found in immediate proximity to the vegetable species, although there is no direct physical contact between the adsorbent and the vegetable, since the walls of the material permeable to the gases of the con-container retaining the reactive adsorbent. This method is particularly suitable for preserving fruit and flowers such as the carnation, gladiolus, rose, dahlia, camellia, narcissus, tulip and any other whatsoever. The vegetable to reactive adsorbent ratio expressed by vegetable weight/adsorbent reagent weight, varies with the species to be preserved, but it is generally found in the range of 300:1 to 6000:1.

For preserving the vegetable products the adsorbent should not be in physical contact nor should it form dust, the $CO_2$ being the only gas evolved in amounts proportional to the undesirable organic compounds eliminated.

The material of the containers permeable to the gases, which contain the reactive adsorbent material, can be any at all which meets the function of retaining the contents of a solid and allowing the gaseous exchange, and can be paper, perforated polyethylene film, perforated stiff plastic, perforated glass, etc. The container can be any which meets the mission of allowing the passage of gases through its walls, such as jars, bag, envelope, etc., etc. It has to be made clear that the material of the wall can be both stiff (jars, plastic and perforated glass jars) or flexible (paper, plastic film such as polyethylene and the like in the case of small bags and envelopes).

According to a variant of the improved vegetable preserving process of the present invention, the reactive adsorbent, manufactured in the form of reloadable cartridge for filter of air or granules confined in an housing of porous or perforated walls is placed on the inside of an air filter through which the air containing ethylene from a vegetable preserving area is recycled.

From now on the invention is described by the following examples, which simply illustrate the invention and in no way at all limit its scope.

EXAMPLE 1

A potassium permanganate solution is prepared at 5% by weight in water. In a beaker 800 ml of said solution are placed and 300 grams of sepiolite are added, previously treated at 200° C. for 3 hours. After 10 hours of impregnation the solid product is drained for another 3 hours, then to proceed to drying at 90° C. for 30 minutes. The product so obtained with a surface area of 170 $m^2/g$ and a salt content of about 3% by weight, was tested in the laboratory, an airstream 130 ml/min saturated in water at 25° C. and atmospheric pressure flowing at a temperature of 25° C., with a content of 2000 ppm of ethylene through 20 grams of the granules obtained. The results obtained were as follows:

| Amount of permaganate present: | 3.66 milimoles |
| Amount of ethylene eliminated: | 1.80 milimoles |
| Amount of $CO_2$ generated: | 0.91 milimoles |
| Content of steam in the medium: | constant |

EXAMPLE 2

The test was made using 100 grams of powdered sepiolite with the following particle size distribution:

| Opening of the mesh in mm | % of powder |
| --- | --- |
| 0.250 | 0.2 |
| 0.177 | 0.6 |
| 0.150 | 1.9 |
| 0.100 | 11.9 |
| 0.075 | 22 |
| <0.075 | 62.7 |

In turn the fraction <0.075 has the following distribution:

| Opening in mm | % of powder |
| --- | --- |
| 0.050 | 21.5 |
| 0.037 | 20.2 |
| 0.037 | 21.0 |

After grinding to obtain a suitable powder size it is mixed with a 2.5% by weight aqueous solution of potassium permanganate, using an amount of $KMnO_4$ solution such that a thick slurry is formed. Thereafter said thick slurry is shaped by extrusion into cylinders of 2–5 mm in in diameter and 3–5 mm in length. Subsequently the cylinders are dried by heating in a suitable container until their water content is 27%. After being withdrawn from the drier the shaped reactive adsorbent is packaged in nonperforated impermeable opaque bags, of 500 g capacity, which are closed by heat sealing for keeping until the time of use.

EXAMPLE 3

In way analogous to the one described in Example 2, other shapes are prepared such as tablets, discs, pellets and reloadable cartridges for filters, which are likewise kept in containers with impermeable opaque walls until the time of being used.

COMPARATIVE EXAMPLES

In the examples that follow the markedly superior action of the adsorbent of the invention, compared with the two adsorbents or prior art and without any adsorbent whatsoever, is shown.

In said Examples a Japanese adsorbent is used of the trade name New Green Pack, and an English adsorbent commercialised under the trade name Ethysorb, which has been selected through being a widely-known adsorbent for this use. The adsorbent of the invention is on some occasions that called "Green-Keeper" which corresponds to the pending Spanish trademark No. 1180033.

It should remain clear that the term "adsorbent" is entirely equivalent to "rective adsorbent" and "ethylene adsorbent".

The experiments corresponding to Examples 4 to 7 have been performed at the "Instituto del Frio del Consejo Superior de Investigaciones Cientificas", an autonomous Spanish government body dependent on the Department of Education and Science.

EXAMPLE 4

From a very broad gladioli sample, various batches were formed.

In each polystyrene box 4 bunches of white gladioli and 3 of pink gladioli were included, placed standing up to counteract the geotrophism of the gladioli.

All of the gladioli were cut at their base to leave them with a total length of one meter.

The effects on the quality were studied, both during cold storage and after the period of useful or decorative life, better known as "vase life", of the ethylene adsorbent of this invention, in granular form of 2-4 mm, in comparison with the Japanese adsorbent and the English adsorbent. Furthermore, a batch was provided without any kind of adsorbent acting as control.

To make up the batches 2 bags of each adsorbent product were placed, except for the Japanese one for which only one bag was used, in each one of the boxes containing the gladioli.

The boxes were put into a cold chamber at +2.5° C. ±0.5° C. temperature, provided with fluorescent light (1000 Lux) which allowed the supply of 10 hours of light every 24 hours of testing time.

The ethylene content in the boxes was analysed every 24 hours for 7 days. The ethylene concentration in the different boxes is shown in Table I.

In this same period of time the respiratory intensity was evaluated, the results being shown in Table II.

After 30 days the weight losses indicated in Table III were observed.

Similarly, analyses were made of colour maintenance starting from the original colour of the flowers. The best response, as far as colour maintenance is concerned, is from those batches the differences whereof respect of the starting colour are the least.

The parameter "a" negative (green) is more stable and in turn, the more intense during the course of one month of conservation, at 2.5° C. in the batch of the adsorbent of the invention, which indicates greater chlorophyl retention due to the presence of the adsorbent of the invention, there being no differences between the face and the underside of the leaves in this case.

Respecting parameter "b" (yellow) it is maintained best in the underside with the adsorbent of the invention and is followed by the control in the face. It is therefore the one with less evolution.

The L/b chromatic index in the white gladiolus confirms the predisposition of the adsorbent of the invention for keeping the original aspect of the colour of the underside of the leaf.

The saturation index is greater with the adsorbent of the invention both in the face and in the underside of the leaves on comparing the batches with adsorbent and only on the underside if the control is included in the comparison.

In the pink gladioli it is gathered from the study that the batch which keeps the initial colour best is the one of the adsorbent of the invention, as far as the three Hunter (L, a and b) parameters are concerned, the red component of the colour (+a) being more intense both in the face and in the underside.

The saturation index is the closest to the original one in the case of the adsorbent of the invention after 11 days of conservation, and still continues to be the most intense one after 30 days, although it differs little from the Japanese adsorbent in the underside.

The L/a index considered as the best chromatic index for studying the change of the red colour has throughout kept closest to the original value in the case of the batch of the adsorbent of the invention, both in the face and the underside. In conclusion this batch is the one which has best kept the original pink colour of the gladiolus.

TABLE I

Ethylene Concentrations (ppm) in the confined atmosphere of each test batch at +2.5 ± 0.5° C. with white and pink gladioli together.

| Batch | Continuous days of testing | | | | | | average concentration ($C_2H_4$ ppm) |
|---|---|---|---|---|---|---|---|
| | 1 | 2 | 4 | 5 | 6 | 7 | |
| Control | 0.10 | 0.22 | 0.31 | 0.25 | 0.11 | 0.24 | 0.205 |
| English adsorbent | 0.03 | 0.03 | 0.03 | 0.04 | 0.03 | 0.07 | 0.038 |
| Japanese adsorbent | 0.01 | 0.03 | 0.03 | 0.12 | 0.11 | 0.06 | 0.060 |
| Adsorbent of the invention | 0.03 | 0.02 | 0.00 | 0.01 | 0.02 | 0.00 | 0.013 |

TABLE II

Effect of the different adsorbents on the respiratory intensity of each batch

| Batch | Respiratory intensity ml $CO_2$/Kg/hr |
|---|---|
| Control | 5.61 |
| English adsorbent | 4.74 |
| Japanese adsorbent | 6.76 |
| Adsorbent of the invention | 3.00 |

TABLE III

Weight loss by the gladioli as accumulated percentage in 30 days

| Batch | % accumulated 30 days |
|---|---|
| Control | 5.8 |
| English adsorbent | 3.9 |
| Japanese adsorbent | 3.1 |
| Adsorbent of the invention | 1.2 |

EXAMPLE 5

The "Scania" red carnation variety was chosen, on corresponding to the kind involving greater conservation difficulty, to study the effects on quality, both during the period of useful or decorative life, of the adsorbent of the invention (Green Keeper). This was likewise carried out in the English adsorbent and with a batch without any kind of adsorbent which acted as control.

The carnations were received in amounts of 34 dozen, formed by 17 separate bunches of 2 dozen each and included their corresponding stems of about 80 cm in length.

The recently-cut bunches of carnations were kept in a thermostatised chamber at $+1\pm0.5°$ C., the carnation stems all being cut to a length of 60 cm. Each bunch which contained 36 units was deposited on an open plastic box which was in turn put into a polyethylene bag. One of these bags would serve as control. In another four, which were placed on the floral mass, envelopes containing $5\pm0.2$ g of adsorbent; in the first and second bags intended for periodical analyses one and two envelopes were placed, respectively; in the third and fourth bag 1 and 2 envelopes were like wise placed. In like fashion another four bags were prepared with the English adsorbent.

The ethylene concentration in the control bag showed a maximum of 0.04 ppm/Kg of fresh carnation after 90 test hours, 0.02 ppm/Kg after 258 hours. In the performance of this variable in the test bags no difference was observed between using 1 or 2 envelopes: the maximum was observed after 306 hours with a concentration of 0.05 ppm/kg/hr of fresh carnation for the batch with an English adsorbent envelope; and after 258 hours of confinement 0.02 ppm/kg/hr with an envelope for the adsorbent of the invention which, after 12 days, descended to negligible values as shown in Table IV.

After 17 test days the bunches were taken out of the cold chamber and the water adsorption ws measured at 20° C., factor indicative of the extent of the useful decorative lifetime.

The water absortion capacity of the test carnations is reflected in Table V.

TABLE IV

Evolution of the ethylene content of the different "Scania" carnation test batches in confined atmosphere at $+1°$ C. (ppm of $C_2H_4$/kg/hour, of fresh carnation).

| Hours of confinement | Control | Batches English adsorbent | | Adsorbent of the invention | |
|---|---|---|---|---|---|
| | | 1 env. | 2 envs. | 1. envs. | 2. envs. |
| 90 | 0.04 | 0.03 | 0.00 | 0.00 | 0.00 |
| 114 | 0.03 | 0.02 | 0.05 | 0.00 | 0.00 |
| 210 | 0.02 | 0.03 | 0.01 | 0.005 | 0.005 |
| 234 | 0.03 | 0.03 | 0.005 | 0.007 | 0.005 |
| 258 | 0.02 | 0.04 | 0.02 | 0.02 | 0.01 |
| 282 | 0.02 | 0.04 | 0.02 | 0.01 | 0.00 |
| 306 | 0.02 | 0.05 | 0.01 | 0.00 | 0.00 |

TABLE V

Water absortion capacity by "untouchable" bunch carnations.

| Batch | Water absortion percentage, % by weight |
|---|---|
| Control | 4.82 |
| English adsorbent | 0.316 |
| Adsorbent of the invention | 9.12 |

EXAMPLE 6

The pear "Blanquilla" was selected as vegetable material for the tests, studying the evolution of the hardness of the pulp, of the titrable acids and of the soluble solids, as well as their weight loss due to transpiration and respiration.

Besides the test batches corresponding to the different forms of presentation of the adsorbent of the invention (Green Keeper) tests were also made on a batch with the English adsorbent and a batch without any kind of adsorbent which acted as control.

Fruits were selected of size comprised between 50 and 55 mm with a hardness of about 5 kg measured with an Effe-Gi penetrometer. Once the fruit was brought to a temperature of $+20°$ C. three groups of 30 pieces of fruit each were formed, which were put into three glass deposits 20-liter capacity. In one of these deposits a bag was placed with 5 g of the adsorbent of the invention, and in the second deposit the English adsorbent was placed in like fashion. The third deposit served as control. Thereafter the deposits were closed up and were put into an isothermed chamber at $+20°$ C., thus commencing the test.

The evolution of ethylene content was determined by extractions of 1 ml of gas through a sampling device located in the chamber generatrix; the analysis was performed in a gas chromatograph equipped with flame ionisation detector and results thereof appear in Table VI.

Further, the control fruits showed average values for the soluble solids/titrable acids ratio of 8.66 and of the Thiault index 24.26, with the English adsorbent these values were 8.96 and 24.46 respectively, while with the adsorbent of the invention these values were 8.04 and 24.90, respectively. These values were obtained after 152 continuous hours of confinement, 5 minutes of opening and confinement again until 221 hours were completed.

TABLE VI

Ethylene concentrations ($\mu$l. $1^{-1}$ or ppm) in the confined atmosphere of each test batch at $+20°$ C.

| Batch | Continuous hours of testing | | | | |
|---|---|---|---|---|---|
| | 18 | 42 | 80 | 108 | 127 |
| Control | 11.69 | 33.19 | 66.97 | 77.25 | 72.43 |
| English adsorbent | 3.44 | 10.37 | 18.88 | 15.99 | 11.21 |
| Adsorbent of the invention | 0.05 | 2.97 | 2.92 | 1.30 | 0.30 |

EXAMPLE 7

In this example tests are shown carried out with tomatoes of the "mazarron" variety.

The tomatoes were selected for their variety characteristics of size, shape and aspect and, paying attention to their colouring, showing a state of developing ripeness with 25% of the total surface yellowish or pinkish in colour.

Logically, those which showed any kind of physiological, fungal or mechanical damage were discarded.

Test conditions

There were established 5 batches of 6 fruits in sealed chamber at 20° C. and 40% relative humidity and diffent adsorbents both in amount and in their morphological and structural characteristics.

With the exception of the control batch, the remaining test batches had 1 bag of adsorbent ($5\pm0.2$ g) incorporated into them, reaching an approximate final ratio of 315 g of fresh tomato/g of adsorbent or 155 g of tomato/g of adsorbent, respectively.

The evolution of the ethylene content in the respiration chambers was determined periodically by extracting 1 ml of gas through a sampling device located in the chamber generatrix, the analysis being made in a gas chromatograph. The results can be seen in Table VII.

The absence of the climatic ripening during the experiment, quantified on there being no increase of ethylene was observed in the colour results obtained at the end of the conservation period.

The values of the parameters "L" and "a" measured in the HUNTER differential colorimeter confirm the absence of physiological and commercial ripening of the fruit. The values of the "a" parameter increased, but without reaching the value of the ripe tomato.

Specifically, the batch treated with "Ethysorb" showed a greater colour change, and thus a value for the parameter "a" of −7.03 passed to 3.65 and the control from −5.51 to 2.77. On the contrary, the batches treated with the Green Keeper adsorbent showed a lesser variation in relation to the parameter "a", since they varied from 0.17 to −1.15.

Finally, the weight variations annotated at the end of the experiment give less loss of weight in the batches conserved with the Green Keeper adsorbent, since the control lost 1.05% in weight, the English adsorbent "Ethysorb" lost 4.67% in weight while, on the contrary, with Green Keeper the weight losses were 0.63%.

TABLE VII

Analysis of ethylene during the conservation of tomatoes in confined atmosphere at +20° C., using different types of adsorbents, after 18 hours and after 114 hours.

| Batch | $\mu$l of ethylene $Kg^{-1} hr^{-1}$ (18 hours) | $\mu$l of ethylene $Kg^{-1} hr^{-1}$ (114 hours) |
|---|---|---|
| Control | 5.90 | 3.41 |
| E | 1.67 | 0.61 |
| GK | 0.39 | 0.05 |
| GKM | 0.42 | 0.05 |
| GKE | 0.81 | 0.02 |

| Kinds of adsorbents used | |
|---|---|
| E | = Ethysorb |
| GK | = Green Keeper in granules of 1–3 mm in average diameter |
| GKM | = Green Keeper in granules of 2–5 mm in average diameter |
| GKE | = Green Keeper extruded. |

Just as indicated in the above Examples, the adsorbent of the invention notably improves upon the conservation performance provided by known commercial adsorbents.

We claim:

1. A reactive adsorbent for the preservation of harvested vegetables comprising a sepiolite carrier impregnated with an aqueous solution of potassium permanganate.

2. The reactive adsorbent, as in claim 1, in which the impregnated sepiolite is in granular form, the form of pellets, extrudates, or reloadable cartridges for filters.

* * * * *

UNITED STATES PATENT AND TRADEMARK OFFICE
CERTIFICATE OF CORRECTION

PATENT NO. : 4906398

DATED : March 6, 1990

INVENTOR(S) : Alvarez et al

It is certified that error appears in the above-identified patent and that said Letters Patent is hereby corrected as shown below:

On the title page, item [54] and in column 1, line 2, in the title of the invention, change "ABSORBENTS" to --ADSORBENTS--.

Signed and Sealed this

Twenty-third Day of July, 1991

Attest:

HARRY F. MANBECK, JR.

*Attesting Officer*  *Commissioner of Patents and Trademarks*